United States Patent [19]

Visser et al.

[11] Patent Number: 4,593,760
[45] Date of Patent: Jun. 10, 1986

[54] REMOVAL OF VOLATILE CONTAMINANTS FROM THE VADOSE ZONE OF CONTAMINATED GROUND

[75] Inventors: Melvin J. Visser, Portage, Mich.; James J. Malot, Dorado,

[73] Assignee: The Upjohn Company, Kalamazoo, Mich.

[21] Appl. No.: 567,972

[22] Filed: Jan. 4, 1984

[51] Int. Cl.⁴ ............................................. E21B 43/00
[52] U.S. Cl. .................................. 166/267; 166/370; 166/313
[58] Field of Search .............. 166/267, 268, 369, 278, 166/370, 313

[56] References Cited

U.S. PATENT DOCUMENTS

| | | | |
|---|---|---|---|
| 825,745 | 7/1906 | Mitchell | 166/268 |
| 1,286,666 | 12/1918 | Layne | 166/268 |
| 1,877,915 | 9/1932 | Lewis . | |
| 2,104,327 | 1/1938 | Kotzebue | 166/21 |
| 2,180,400 | 11/1939 | Coberly | 166/369 X |
| 2,765,850 | 10/1956 | Allen | 166/39 |
| 3,140,986 | 7/1964 | Hubbard | 202/52 |
| 3,277,962 | 10/1966 | Flickinger et al. | 166/278 |
| 3,705,851 | 12/1972 | Brauer | 210/1 |
| 3,735,815 | 5/1973 | Myers | 166/313 |
| 3,765,483 | 10/1973 | Vencil | 166/313 X |
| 4,026,355 | 5/1977 | Johnson et al. | 166/369 X |
| 4,167,973 | 9/1979 | Forte et al. | 166/267 |
| 4,183,407 | 1/1980 | Knopik | 166/370 |
| 4,278,502 | 7/1981 | Stevens et al. | 202/206 |
| 4,303,127 | 12/1981 | Freel et al. | 166/266 |
| 4,323,122 | 4/1982 | Knopik | 166/369 X |
| 4,366,846 | 1/1983 | Curati, Jr. | 141/1 |
| 4,369,839 | 1/1983 | Freeman et al. | 166/369 X |

OTHER PUBLICATIONS

Ham, Robert K., "Large Elevation Landfilling for Refuse Disposal", *Public Works*, Jan. 1970, pp. 92-95.
Josephson, Julian, "Restoration of Aquifers".

*Primary Examiner*—Stephen J. Novosad
*Assistant Examiner*—Bruce M. Kisliuk
*Attorney, Agent, or Firm*—Flynn, Thiel, Boutell & Tanis

[57] ABSTRACT

Volatile contaminants are removed from the vadose zone of contaminated ground by pumping volatilized contaminants from the vadose zone using one or more vacuum extraction wells.

3 Claims, 3 Drawing Figures

REMOVAL OF VOLATILE CONTAMINANTS FROM THE VADOSE ZONE OF CONTAMINATED GROUND

BACKGROUND OF THE INVENTION

1. Field of the Invention

This invention relates to a process for removing volatile contaminants from the vadose zone, also known as the zone of aeration or the unsaturated zone, that is, the zone between the earth's surface and the underground water table.

In the following description, the term "volatile liquid contaminant" shall mean the liquid phase of the contaminant and the vapor phase in equilibrium therewith in the subsurface media.

Contamination of the subsurface ground with potentially hazardous materials is a common problem facing industry, the government and the general public. Often, as a result of spills, leakage from storage facilities or surface discharges, contaminants enter subsurface soil and/or rock formations. These contaminants eventually percolate into the groundwater, thereby posing a health threat to drinking water supplies. Various methods for withdrawing and treating contaminated groundwater are well known and widely practiced. However, methods for decontaminating subsurface soil and/or rock located in the vadose zone, above the water table, are limited. Generally, the contaminated soil in the vadose zone is excavated and removed. Alternatively, the contaminated soil can be left in place so that the contaminants can be leached out by percolating water and then the contaminated percolating water can be removed and recovered after it has reached the water table. The leaching of contaminants from subsurface media is extremely slow for many common contaminants because of their low solubility in water and their absorption by soil and rock formations. As a result, remedial measures, directed at cleaning up and protecting the groundwater near a contamination site, must be performed for many years or even decades. In addition, the prior methods are ineffective for removing, from the vadose zone, contaminants having a low solubility in water and/or a high affinity for soil, which class of contaminants includes most of the hazardous pollutants that affect groundwater. The present invention involves removing volatile contaminants directly from the subsurface media in the vadose zone above the water table.

2. Description of the Prior Art

Numerous techniques exist for removing gas that is formed naturally in landfills and other constructed media. Circulation systems for leaching the contaminants from contaminated media above the water table have been designed, but they invariably require that the leached contaminants enter the water table or aquifer and be recovered by means of a water removal well and pump that draws water from the saturated zone or aquifer (see, for example, Forte et al, U.S. Pat. No. 4,167,973). In addition, it has been proposed to remove contaminant vapors from contaminated underground areas by means of a plurality of elongated perforated collection elements installed in a large excavation (see Knopik, U.S. Pat. No. 4,183,407). However, this system is limited to removal of contaminants from depths for which excavation is practical, usually less than about 25 feet deep.

The present invention provides a method for removing volatile contaminants from subsurface media, directly from any depth, within the vadose zone, without effecting hazardous and expensive excavation of a large amount of contaminated soil or rock. The equipment used to perform the present invention can be conventional equipment, most of which can be installed on the surface of the ground. Thus, the equipment need not be specially manufactured or installed within the contaminated area beneath the ground surface. The equipment can be installed with minimal disruption of the subsurface media. This is especially important in industrial environments in which excavation may be detrimental to industrial operations or the integrity of industrial structures in the area of contamination.

SUMMARY OF THE INVENTION

The present invention includes the steps of directly removing volatile liquid contaminant, which is percolating through the subsurface media, from the subsurface media in the vadose zone above the water table and then collecting, treating or otherwise disposing of the removed contaminant. According to the invention, one or more wells are drilled into the subsurface media in the contaminated area. The well is constructed so that fluids in the vadose zone can flow into the well, whereas the liquid in the saturated zone below the water table cannot substantially flow into the well. The upper portion of the well is impervious, whereas the lower portion of the well is perforate or open to the flow of fluid thereinto. The lower portion of the well is surrounded by a permeable material, such as gravel. The upper portion of the well is filled with a material of low vapor permeability whereby to inhibit leakage of air from the surface of the ground to the lower perforate portion of the well. The upper end of the well is connected to a suitable vacuum source, for example, an exhaust fan, blower or vacuum pump, to create a relative pressure drop in the well, thus inducing flow of volatile contaminants directly into the perforate lower portion of the well. Once the contaminants are in the well, they can be removed by means of the fan, blower or vacuum pump, and/or by means of an optional submersible pump located at the bottom of the well. The exhaust of the fan, blower or vacuum pump, and/or the submersible pump, can be connected to a suitable recovery, treatment and/or discharge system.

Thus, according to the invention, volatile contaminants are removed from the vadose zone of a contaminated underground area by a series of steps which comprises, firstly, establishing a borehole from the surface of the ground within the contaminated area by drilling or driving a borehole in any conventional manner. The borehole may extend partway to the water table so that the bottom of the borehole is located in the vadose zone and may be spaced above the water table. However, the borehole and the hereinafter mentioned perforate lower portion of the conduit may extend into the saturated zone, in which case the perforate lower portion of the conduit will be effective to draw contaminant from the vadose zone and the vacuum in the conduit will be insufficient to draw a significant amount of water from the saturated zone into the conduit. However, if desired, a separate sampling device can be provided in the borehole for obtaining samples of the groundwater. A conduit or well casing is inserted in and is radially inwardly spaced from the borehole so that a ring or annular zone is defined between the wall of the borehole and the conduit. The conduit has a perforate lower portion so that fluids can flow into the interior thereof, whereas the upper portion of the conduit is imperforate. The annular zone between the perforate lower portion of the conduit and the borehole wall is filled with a loose, fluid-permeable, first, fill material which extends substantially up to the upper end of the perforate lower portion of the conduit. Thus, the pressure drop between the perforate lower portion of the conduit and the lower borehole wall portion opposed thereto will be low, and the fluid-permeable fill material will easily permit fluid to flow into the perforate lower portion of the conduit when vacuum is applied to the conduit. The annular zone above the perforate lower portion of the conduit is packed with a second fill material of low permeability which is effective to impede flow of air from the ground surface downwardly toward the lower portion of the borehole. Thus, the flow of air from above ground vertically downwardly into the conduit is minimized in order to increase the flow of the volatilized contaminant from the subsurface media into the conduit. A vacuum is applied to the upper end of the conduit so as to draw vapor of the contaminant present in the vadose zone into the lower portion of the conduit, the contaminant vapor then flowing to the upper end of the conduit, from whence it can be fed to other equipment for treatment, recovery or discharge. The perforate lower portion of the conduit is located in the vadose zone. When the perforate lower portion of the conduit extends into the saturated zone, no significant amount of groundwater is drawn from the saturated zone into the conduit.

DETAILED DESCRIPTION OF THE INVENTION

Figure 1:
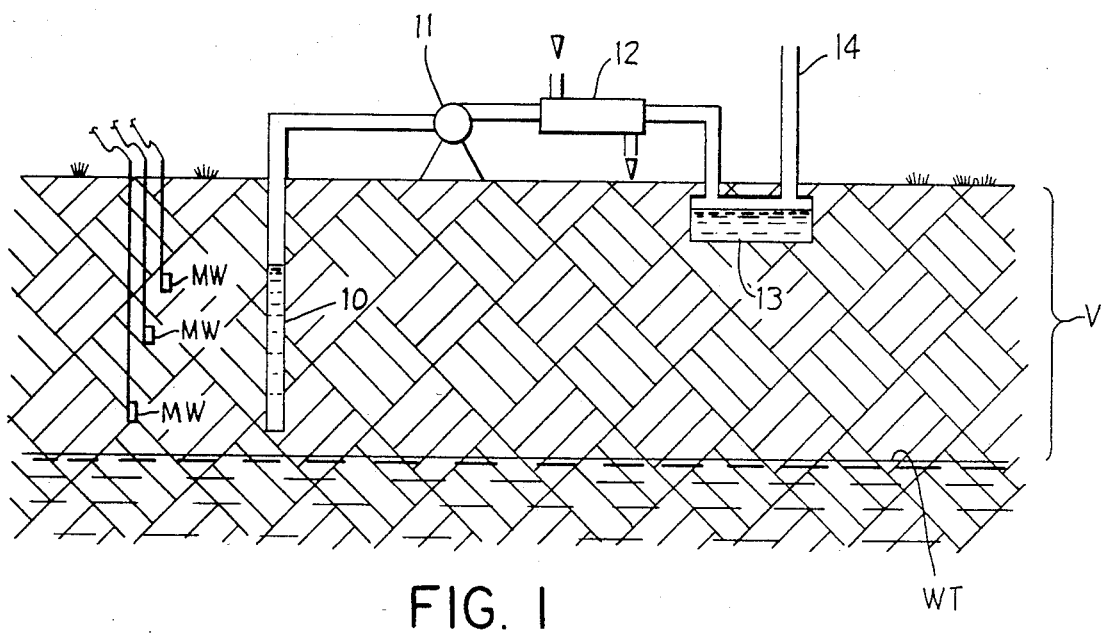
FIG. 1 is a schematic view of a vacuum extraction system according to the invention.

The invention is used to treat of subsurface media in the vadose zone V (FIG. 1), which media is contaminated with one or more volatile liquid contaminants. The volatile liquid contaminant may be percolating downwardly toward the water table, or it may be relatively stationary in the vadose zone. For example, the contaminants can be aliphatic and/or aromatic hydrocarbons, halogenated hydrocarbons, or other volatile organic compounds (VOCs). Such contaminants can be volatilized when subjected to vacuum or a flow of air. The process of the invention is preferably used for removal of contaminants having vapor pressures of at least 20 mmHg at temperatures of 25° C. or less, and is most preferably used for removal of contaminants having vapor pressures of 100 mmHg at temperatures of 25° C. or less. Contaminants having lower vapor pressures can be removed, but the rate of removing them is lower. The purpose of the invention is to volatilize and remove the contaminants directly from the contaminated zone so as to minimize the amount of contaminant that enters the saturated zone, that is, the zone below the water table WT (FIG. 1). The treatment is effected in situ without substantial excavation or other disturbance of the subsurface media. The invention is a cost effective procedure for removing contaminants and it is effective to shorten the time required to clean up the contamination. The invention is particularly good for removing water-insoluble or sparingly water-soluble contaminants, but it is also useful for removing water-soluble contaminants.

The invention is particularly concerned with removing the contaminant from the vadose zone. However, the process according to the present invention can and normally will be used in combination with an additional system or systems for reclaiming contaminated groundwater because not all of the contaminant will be removed by the treatment according to the invention. Thus, for example, one or more additional pumps can be provided to remove groundwater from the aquifer, treat it and then recharge it into the aquifer after removing the contaminant therefrom. The latter technique is well known in the art.

When contamination of the subsurface media has occurred and it is desired to remove the contaminants therefrom, the region of the subsurface media that is contaminated will be delineated by techniques which are well known in the art. For example, test borings can be made at selected locations and at selected depths in and around the contamination site to determine subsurface geologic conditions. In addition, chemical analyses of core samples taken during the test borings for determining geologic conditions are subjected to chemical assay to delineate the extent, thickness, rate of spread and contents of the contamination in the unsaturated zone.

After the contamination area has been delineated as discussed above, the location or locations at which the installation of a vacuum extraction well will be expected to be effective to remove contaminant from the subsurface media will be determined, based on hydrogeologic considerations. A vacuum extraction well will then be installed at one or more of those locations. The vacuum extraction well or wells may be installed in porous underground media, preferably permeable, fine-grain materials such as silts and sands, so that the well(s) will be effective to remove the contaminant that is present in the underground media around the well.

If the subsurface media is relatively nonpermeable, such as clay, the vacuum extraction well can be operated so as to dry the surrounding clay so that it cracks and becomes more permeable whereby contaminants can flow into the well.

Referring to FIG. 1, the vacuum extraction well 10 is connected to a suitable vacuum source 11, such as an exhaust fan, blower or vacuum pump. The discharge from the vacuum source 11 is connected to any suitable system for collecting, treating, or otherwise disposing of the removed contaminants. In the illustrated embodiment of FIG. 1, the gas discharged from the vacuum source 11 is flowed through a condenser 12 wherein the water vapor and, possibly, some or all of the volatilized contaminant that is contained in the discharged gas may be condensed. The condensate and gas are then flowed into a storage tank 13. The volatile contaminant gas is then discharged into the ambient air through the stack 14. When discharge of the volatilized contaminant into the ambient air is not feasible because of environmental constraints or the like, the contaminant can be treated in other known ways, such as by adsorption, for example, by activated carbon, oxidation or other chemical or biological treatment, to render same harmless. If the contaminant is a useful substance, it can be collected for future use. During operation of the vacuum extraction well, the monitoring wells MW can be used to sample the subsurface conditions around the vacuum extraction well and monitor the effectiveness of the treatment.

Figure 2:
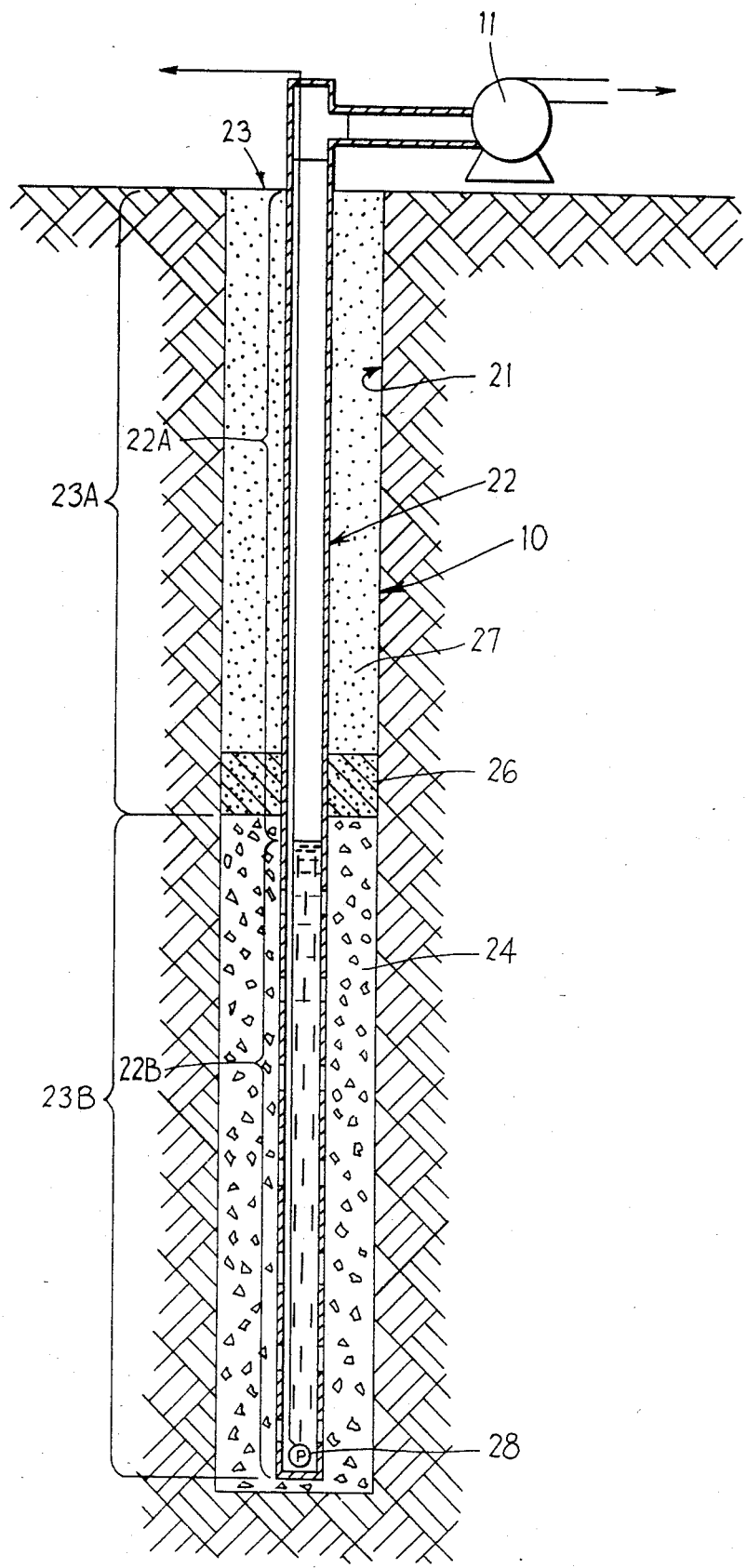
FIG. 2 is a partial cross-sectional elevational view of a vacuum extraction well used in the system of FIG. 1.

Referring to FIG. 2, the vacuum extraction well 10 is comprised of a borehole 21 which can be dug in the ground by any well-drilling method suitable for penetrating the subsurface media that is present at the contamination site. A vertical well casing or conduit 22, which is of smaller diameter than the borehole 21, is installed substantially coaxially within the borehole so as to form an annular zone 23 therebetween. The upper portion 22A of the pipe 22 is imperforate, whereas the lower portion 22B of the pipe is perforate so that fluid can flow therethrough from the subsurface media into the interior of the pipe. The lower portion 23B of the annular zone between the lower portion 22B of the pipe 22 and the borehole wall is packed with a loose, fluid-permeable, first, fill material 24, such as gravel, sand or rock, so that the pressure drop between the lower perforated portion 22B of the pipe and the borehole wall will be small, whereby fluid present in the region surrounding the lower portion of the borehole wall can easily flow into the perforate lower portion 22B of the pipe 22. The upper portion 23A of the annular zone between the upper portion 22A of the pipe 22 and the borehole wall is filled with a low-permeability material, such as soil, clay or cement. In the illustrated embodiment there is shown a bentonite seal layer 26 made of bentonite balls expanded with water, which seal layer is located close to the upper end of the perforate lower portion 22B of the pipe 22. On top of the bentonite seal layer 26, there is provided a layer 27 of expansive grout which extends from the bentonite seal layer to the surface of the ground. The purpose of the seal layer 26 and the layer 27 of low permeability material in the upper portion of the borehole is to impede flow of air from the surface of the ground to the lower portion 22B of the borehole and to direct the vacuum to zones of higher contamination.

When the vacuum source 11 is turned on, if the subsurface media is a porous permeable material the absolute pressure in the vicinity of the perforate lower portion 22B of the pipe 22 is reduced and, thereby, flow of air, contaminant vapor and liquid is induced through the contaminated media and into the perforate lower portion of the pipe 22. The rate of volatilization of the contaminant is thereby increased and the equilibrium concentration of the contaminant in the vapor phase is also increased. Thus, the contaminant is drawn into the perforate lower portion of the pipe 22 and is brought to the upper end of the pipe 22 whereat it can be treated, collected or otherwise disposed of.

If the subsurface media is relatively nonporous, impermeable, water-bearing clay, it is necessary to apply a sufficiently high vacuum to dry out the clay around the borehole to cause it to crack and thereby become more permeable so that the contaminant can flow into the pipe 22. Thus, when the vacuum source is turned on, it is preferable to establish a pressure of less than 10 mmHg to dry the wall of the borehole. Once the borehole wall has been dried, the operation can proceed in the same manner as described above.

The source of the air that flows into the perforate lower portion 22B of the pipe 22 can be the air that is naturally present in the subsurface media or that infiltrates into the subsurface media from the ambient air at the ground surface. In addition, air for volatilizing the contaminant can be artificially provided by drilling air supply wells or making excavations in the area surrounding the vacuum extraction well 10 in order to promote the flow of fresh air into the subsurface media. The recharging of fresh air into the subsurface media can be passive or active. In passive recharging, an open well or excavation is provided to allow fresh air to enter in response to a pressure gradient. In active recharging, fresh air is pumped under superatmospheric pressure into the subsurface media near the vacuum extraction well 10.

In many installations, liquid water, aqueous contaminant and liquid contaminant will accumulate in the perforate lower portion 22B of the pipe 22 because some of the water that is percolating through the subsurface media toward the water table will be drawn into the pipe 22 by the vacuum. In order to remove this water and any other liquid that may become present in the perforate lower portion 22B of the pipe 22, a submersible pump 28 can be installed close to the bottom of the pipe 22. When the submersible pump 28 is in operation, water and other liquids, including possibly liquid contaminants, are pumped out of the well 10 in the liquid phase. The liquids can be treated in order to remove the contaminant, for example, they can be flowed directly into the tank 13. The pump 28 can be turned on and turned off in response to the liquid level in the pipe 22, as determined by liquid level probes (not shown) in a conventional manner.

The objective of the vacuum extraction of the contaminant from the vadose zone is to minimize the amount of contaminant that enters the aquifer. The most effective zone of accomplishing vacuum extraction of the contaminant is the zone directly above and close to the water table because in that zone, the width of the zone around the vacuum extraction well in which a significant vacuum is present is maximized. Also, the contaminant may tend to accumulate at the surface of the water table when the contaminant is of low water solubility. Thus, it will be preferred to locate the bottom of the perforate lower portion 22B of the pipe 22 close to, but spaced vertically above, the water table WT in the subsurface media being treated. The distance between the bottom of the perforate lower portion 22B and the water table will be determined based on the zone of influence of the vacuum extraction well and the location of the contaminated area.

The vertical height of the upper portion 23A of the annular zone that is packed with the fill material of low permeability, will be chosen to minimize as much as possible the infiltration of air from the ground surface into the lower portion of the borehole.

Figure 3:
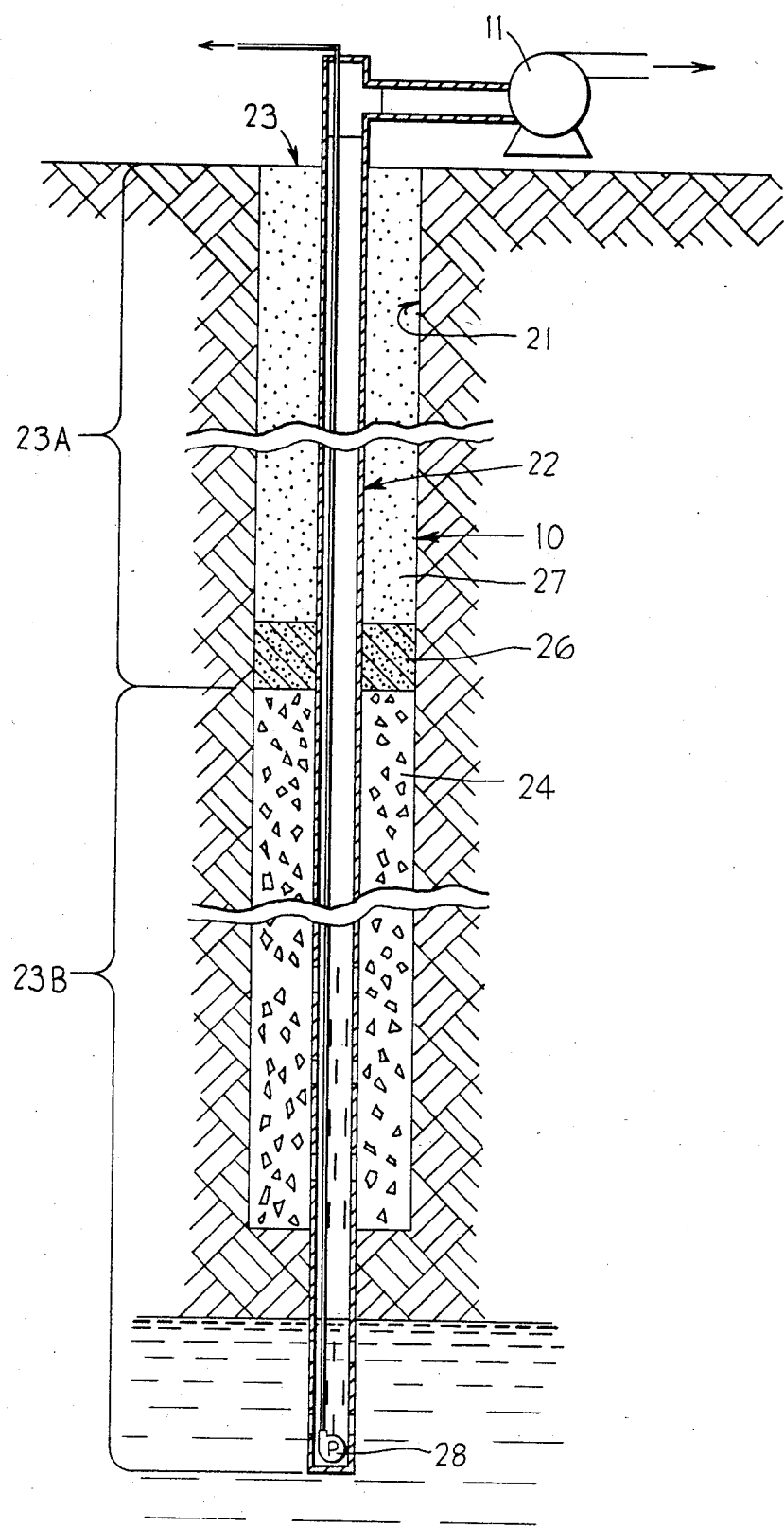
FIG. 3 is a partial cross-sectional elevational view of a modification of a vacuum extraction well.

In another modification of the invention, as illustrated in FIG. 3, the borehole may be drilled into the saturated zone and a pump may be installed to pump water therefrom through a first passageway, while simultaneously a perforate zone may be provided in the borehole communicating with the vadose zone to draw vapor therefrom through a second passageway separate from the first passageway. Thus, the same well can be used as a well for monitoring and removing ground water, and for separately removing volatilized contaminant.

The method according to the invention is effective to remove substantial quantities of volatile contaminant that is present in the subsurface media above the water table whereby to minimize the amount of the contaminant that enters the groundwater. The nature and amount of the contaminant that is present in the subsurface media, the vapor pressure of the contaminant, the characteristics of the subsurface media and the number and sizes of the vacuum extraction wells that are used, are factors that affect the total treatment time and overall effectiveness of the treatment. Although it may be necessary to carry out the treatment for a long period of time, it is likely that the treatment time will be shorter than the time that would be required if the only treatment performed was to pump water from the aquifer and reclaim it. The invention will be particularly advantageous and effective at the early stages of treating the contamination site because it can achieve relatively rapid removal of relatively large quantities of the contaminant. It may also be effective to reduce the spreading of the contaminant in the subsurface media. Thus, if the nature of the contamination requires the use of one or more removal wells for removing contaminated water from the aquifer, separating the contaminant from the water and recharging the decontaminated water into the aquifer, the amount of actually contaminated water that must be pumped out and treated can be reduced so as to make it possible to use a smaller pump, a lesser number of pumps and/or a shorter treatment time period for removing contaminated water from the aquifer.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A process for removing a not-naturally-occurring, volatile liquid contaminant from a contaminated area of the earth, wherein the contaminated area of the earth has a subsurface water table and a subsurface vadose zone above the water table, the contaminant being present in the vadose zone, which comprises the steps of:

establishing a borehole extending downwardly from the surface of the ground within the contaminated area;

placing a first conduit within said borehole so that a ring-shaped zone is formed between the wall of said borehole and said conduit, said conduit having a perforate lower portion located in the vadose zone and spaced vertically above the water table so that fluids can flow from the vadose zone into the interior of said conduit, said perforate lower portion having an upper end and a lower end, said conduit having an imperforate upper portion above the upper end of said perforate lower portion, filling fluid-permeable first fill material into a lower portion of said ring-shaped zone around said perforate lower portion of said conduit and which extends to the upper end of said perforate lower portion so that said first fill material will permit fluid readily to flow into said perforate lower portion of said conduit;

filling a second fill material of low fluid permeability into an upper portion of said ring-shaped zone around said imperforate upper portion of said conduit, said second fill material being effective to impede flow of air from the surface of the ground to the lower portion of the borehole;

applying a vacuum to the upper end of said conduit effective to induce flow of air and a gas containing vapor of said contaminant present in said vadose zone into the lower portion of said conduit and thence to the upper end of said conduit, the vacuum being effective to cause vaporization of a substantial quantity of said contaminant within the vadose zone around the borehole so that said contaminant is removed from the ground in vapor form, and accumulating liquid in the lower end of said conduit and pumping said liquid to the upper end of said conduit separately from said gas.

2. A process for removing a not-naturally-occurring, volatile liquid contaminant from a contaminated area of the earth, wherein the contaminated area of the earth has a subsurface water table and a subsurface vadose zone above the water table, the contaminant being present in the vadose zone, which comprises the steps of:

establishing a borehole extending downwardly from the surface of the ground within the contaminated area;

placing a first conduit within said borehole so that a ring-shaped zone is formed between the wall of said borehole and said conduit, said conduit having a perforate lower portion located in the vadose zone and spaced vertically above the water table so that fluids can flow from the vadose zone into the interior of said conduit, said perforate lower portion having an upper end and a lower end, said conduit having an imperforate upper portion above the upper end of said perforate lower portion, filling fluid-permeable first fill material into a lower portion of said ring-shaped zone around said perforate lower portion of said conduit and which extends to the upper end of said perforate lower portion so that said first fill material will permit fluid readily to flow into said perforate lower portion of said conduit;

filling a second fill material of low fluid permeability into an upper portion of said ring-shaped zone around said imperforate upper portion of said conduit, said second fill material being effective to impede flow of air from the surface of the ground to the lower portion of the borehole;

applying a vacuum to the upper end of said conduit effective to induce flow of air and a gas containing vapor of said contaminant present in said vadose zone into the lower portion of said conduit and thence to the upper end of said conduit, the vacuum being effective to cause vaporization of a substantial quantity of said contaminant within the vadose zone around the borehole so that said contaminant is removed from the ground in vapor form, forming a passageway extending downwardly from the surface of the ground to the vicinity of, but laterally spaced from, said perforate lower portion of said conduit, and flowing air through said passageway into the vadose zone to increase lateral air flow through the vadose zone into said perforate lower portion of said conduit.

3. A process for removing a not-naturally-occurring, volatile liquid contaminant from a contaminated area of the earth, wherein the contaminated area of the earth has a subsurface water table and a subsurface vadose zone above the water table, the contaminant being present in the vadose zone, which comprises the steps of:

establishing a borehole extending downwardly from the surface of the ground within the contaminated area, said borehole extending below the water table;

placing a first conduit within said borehole so that a ring-shaped zone is formed between the wall of said borehole and said first conduit, said first conduit having a perforate lower portion located in the vadose zone and spaced vertically above the water table so that fluids can flow from the vadose zone into the interior of said first conduit, said perforate lower portion having an upper end and a lower end, said first conduit having an imperforate upper portion above the upper end of said perforate lower portion, placing a separate second conduit in said borehole and providing a pump to pump water through said second conduit, filling fluid-permeable first fill material into a lower portion of said ring-shaped zone around said perforate lower portion of said first conduit and which extends to the upper end of said perforate lower portion so that said first fill material will permit fluid readily to flow into said perforate lower portion of said first conduit;

filling a second fill material of low fluid permeability into an upper portion of said ring-shaped zone around said imperforate upper portion of said first conduit, said second fill material being effective to impede flow of air from the surface of the ground to the lower portion of the borehole;

applying a vacuum to the upper end of said first conduit effective to induce flow of air and a gas containing vapor of said contaminant present in said vadose zone into the lower portion of said first conduit and thence to the upper end of said conduit, the vacuum being effective to cause vaporization of a substantial quantity of said contaminant within the vadose zone around the borehole so that said contaminant is removed from the ground in vapor form, whereby the same borehole can be used for monitoring and removing ground water and as a well for separately removing volatilized contaminant.

* * * * *

UNITED STATES PATENT AND TRADEMARK OFFICE
CERTIFICATE OF CORRECTION

PATENT NO. : B1 4,593,760

DATED : June 20, 1989

INVENTOR(S) : Melvin J. Visser and James J. Malot

It is certified that error appears in the above-identified patent and that said Letters Patent is hereby corrected as shown below:

On the title page, under item [56] References Cited: please add the following:

U.S. PATENTS

| PATENT NO. | ISSUE DATE | INVENTOR |
|---|---|---|
| 825,745 | 07/10/06 | Mitchell |
| 1,286,666 | 12/03/18 | Layne |
| 1,877,915 | 09/20/32 | Lewis |
| 2,104,327 | 01/04/38 | Kotzebue |
| 2,180,400 | 11/21/39 | Coberly |
| 2,765,850 | 10/09/56 | Allen |
| 3,140,986 | 07/14/64 | Hubbard |
| 3,277,962 | 10/11/66 | Flickinger, et al. |
| 3,705,851 | 12/12/72 | Brauer |
| 3,735,815 | 05/29/73 | Myers |

UNITED STATES PATENT AND TRADEMARK OFFICE
CERTIFICATE OF CORRECTION

PATENT NO. : B1 4,593,760

DATED : June 20, 1989

INVENTOR(S) : Melvin J. Visser and James J. Malot

It is certified that error appears in the above-identified patent and that said Letters Patent is hereby corrected as shown below:

| PATENT NO. | ISSUE DATE | INVENTOR |
|---|---|---|
| 3,765,483 | 10/16/73 | Vencil |
| 4,026,355 | 05/31/77 | Johnson, et al. |
| 4,167,973 | 09/18/79 | Forte, et al. |
| 4,183,407 | 01/15/80 | Knopik |
| 4,278,502 | 07/14/81 | Stevens, et al. |
| 4,303,127 | 12/01/81 | Freel, et al. |
| 4,323,122 | 04/06/82 | Knopik |
| 4,366,846 | 01/25/83 | Curati, Jr. |
| 4,369,839 | 01/25/83 | Freeman, et al. |
| 2,635,696 | 04/21/53 | Asketh |
| 2,875,831 | 03/03/59 | Martin, et al. |
| 2,969,226 | 01/24/61 | Huntington |
| 3,351,132 | 11/07/67 | Dougan |
| 3,547,190 | 12/15/70 | Wilkerson |
| 3,649,533 | 03/14/72 | Reijonen, et al. |
| 3,653,438 | 04/04/72 | Wagner |
| 3,727,686 | 04/17/73 | Prates, et al. |

UNITED STATES PATENT AND TRADEMARK OFFICE
CERTIFICATE OF CORRECTION

PATENT NO.  : B1 4,593,760
DATED       : June 20, 1989
INVENTOR(S) : Melvin J. Visser and James J. Malot It is certified that error appears in the above-identified patent and that said Letters Patent is hereby corrected as shown below:

| PATENT NO. | ISSUE DATE | INVENTOR |
|---|---|---|
| 3,796,883 | 03/12/74 | Smith, et al. |
| 3,823,777 | 07/16/74 | Allen, et al. |
| 3,990,513 | 11/09/76 | Perch |
| 4,016,930 | 04/12/77 | Arnold |

FOREIGN PATENTS

| PATENT NO. | ISSUE DATE | COUNTRY |
|---|---|---|
| 52-48202 | 4/16/77 | Japan (publ.) |
| 52-52460 | 4/27/77 | Japan (publ.) |

On the Reexamination Certificate, Col. 2 immediately after PUBLICATIONS, please insert the following:

Thornton et al. J. Environ. Sci. Health A17(1), 31-44 (1982)

UNITED STATES PATENT AND TRADEMARK OFFICE
CERTIFICATE OF CORRECTION

PATENT NO. : B1 4,593,760

DATED : June 20, 1989

INVENTOR(S) : Melvin J. Visser and James J. Malot

It is certified that error appears in the above-identified patent and that said Letters Patent is hereby corrected as shown below:

American Petroleum Institute Publication No. 4429, March 1980

EPA Handbook 625/6-82-006, June 1982, pp. 235-282

Ham, Robert K., "Large Elevation Lanfilling for Refuse Disposal" Public Works, Jan. 1970, pp. 92-95

Josephson, Julian "Restoration of Aquifers"

Recovery of Landfill Gas at Mountain View, EPA/530SW/587d, May 1977

Land Disposal of Hazardous Wastes, EPA 600/9-78-016, August 1978, pp. i-ix, 1-104 and 152-255

"Municipal Solid Wastes: Land Disposal", EPA 600/9-79-023a, August 1979

Astle, Alice D., et al, "Estimating Vapor and Odor Emission from Hazardous Waste Sites", Offsite Safety, pp. 326-330, undated

UNITED STATES PATENT AND TRADEMARK OFFICE
CERTIFICATE OF CORRECTION

PATENT NO. : B1 4,593,760  Page 5 of 5
DATED : June 20, 1989
INVENTOR(S) : Melvin J. Visser and James J. Malot It is certified that error appears in the above-identified patent and that said Letters Patent is hereby corrected as shown below:

Rogashewski, P. et al, "Remedial Action Technology for Waste Disposal Sites", Noyes Data Corp. (1983)

Amirtharajah, "Fundamentals and Theory of Air Scour", J. Env. Eng. 110, pp. 573-590

Hewitt et al, "Air Dynamics Through Filter Media During Air Scour", J. Env. Eng. 110, pp. 591-606

Signed and Sealed this

Third Day of November, 1992

Attest:

DOUGLAS B. COMER

*Attesting Officer*   Acting Commissioner of Patents and Trademarks

REEXAMINATION CERTIFICATE (1080th)
United States Patent [19]

Visser et al.

[11] B1 4,593,760
[45] Certificate Issued Jun. 20, 1989

[54] REMOVAL OF VOLATILE CONTAMINANTS FROM THE VADOSE ZONE OF CONTAMINATED GROUND

[75] Inventors: Melvin J. Visser, Portage, Mich.; James J. Malot, Dorado

[73] Assignee: The Upjohn Company

Reexamination Request:
No. 90/001,521, Jun. 3, 1988

Reexamination Certificate for:
Patent No.: 4,593,760
Issued: Jun. 10, 1986
Appl. No.: 567,972
Filed: Jan. 4, 1984

[51] Int. Cl.⁴ ............................................. E21B 43/00
[52] U.S. Cl. .................................... 166/267; 166/313; 166/370
[58] Field of Search ............... 166/267, 268, 369, 278, 166/370, 313; 405/52, 128, 129, 303, 258

[56] References Cited
PUBLICATIONS

Ewes, "Brunnenfilter fur die Gewinnung von Mulldeponiegas", publ. J. F. Nold & Co., Germany (1983).
Rettenberger, "Forschungsergebnisse zum Gashaushalt von Deponien", presented Feb. 23, 1979 at the University of Stuttgart, Germany.
Prinz, "Abriss der Ingenieurgeologie", p. 94 (1982).

*Primary Examiner*—Bruce M. Kisliuk

[57] ABSTRACT

Volatile contaminants are removed from the vadose zone of contaminated ground by pumping volatilized contaminants from the vadose zone using one or more vacuum extraction wells.

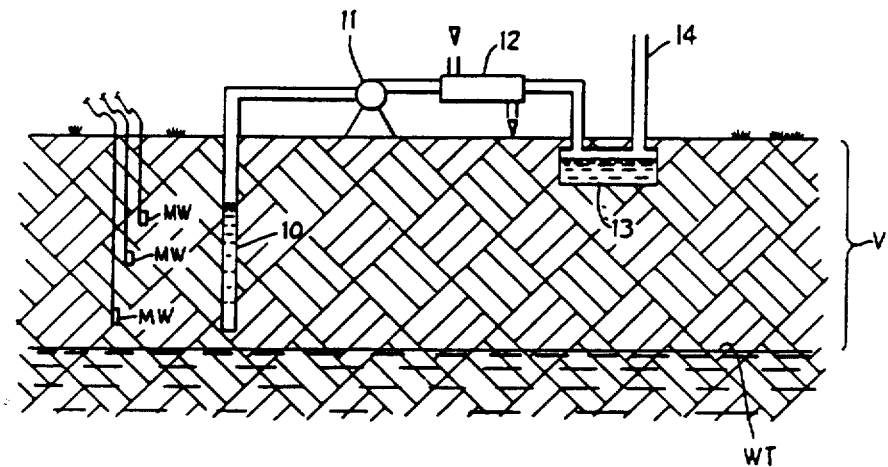

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-3 is confirmed.

* * * * *